Oct. 18, 1938.　　　　　E. M. DODDS　　　　2,133,437
APPARATUS FOR INDICATING THE VARIATION OF ONE
QUANTITY RELATIVELY TO ANOTHER QUANTITY
Filed March 30, 1933　　　4 Sheets-Sheet 1
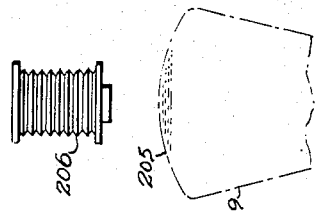
Fig. 11.
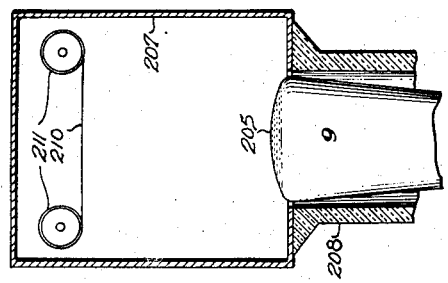
Fig. 10.
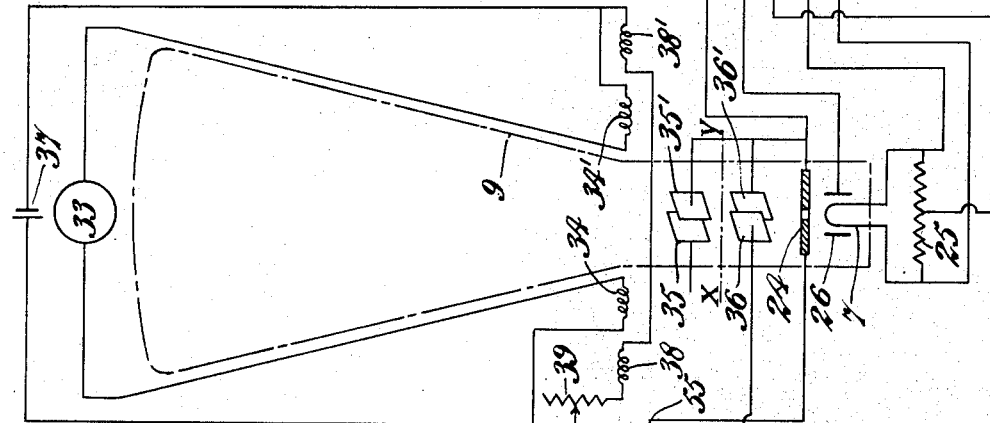
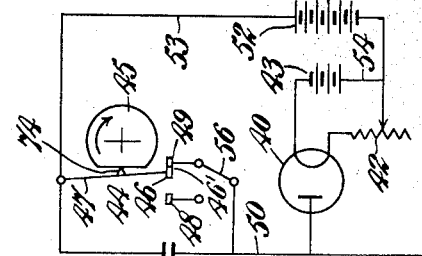
Fig. 1.
Edwin Mathieson Dodds Inventor
W. E. Currie Attorney Oct. 18, 1938.  E. M. DODDS  2,133,437
APPARATUS FOR INDICATING THE VARIATION OF ONE
QUANTITY RELATIVELY TO ANOTHER QUANTITY
Filed March 30, 1933  4 Sheets-Sheet 2
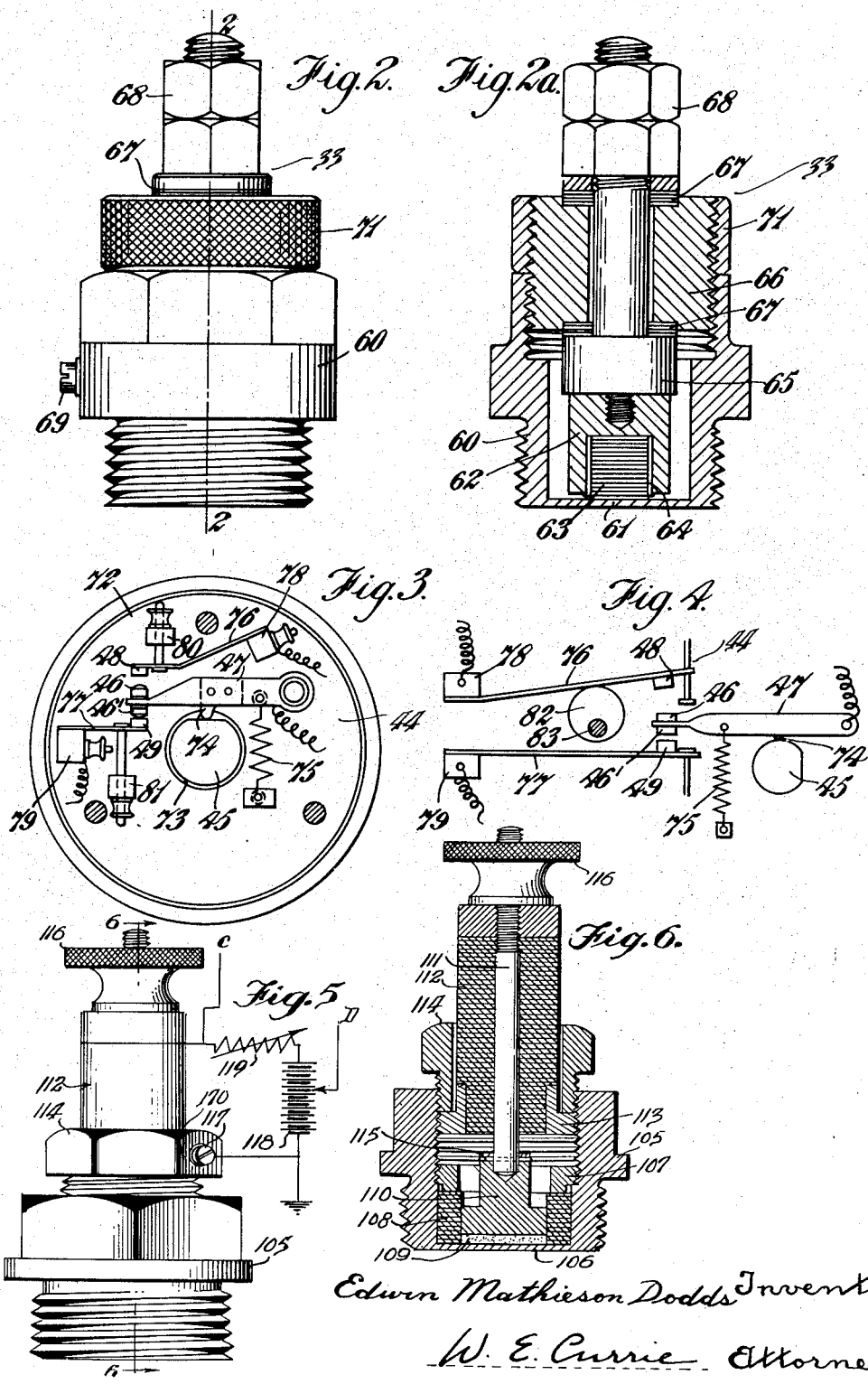

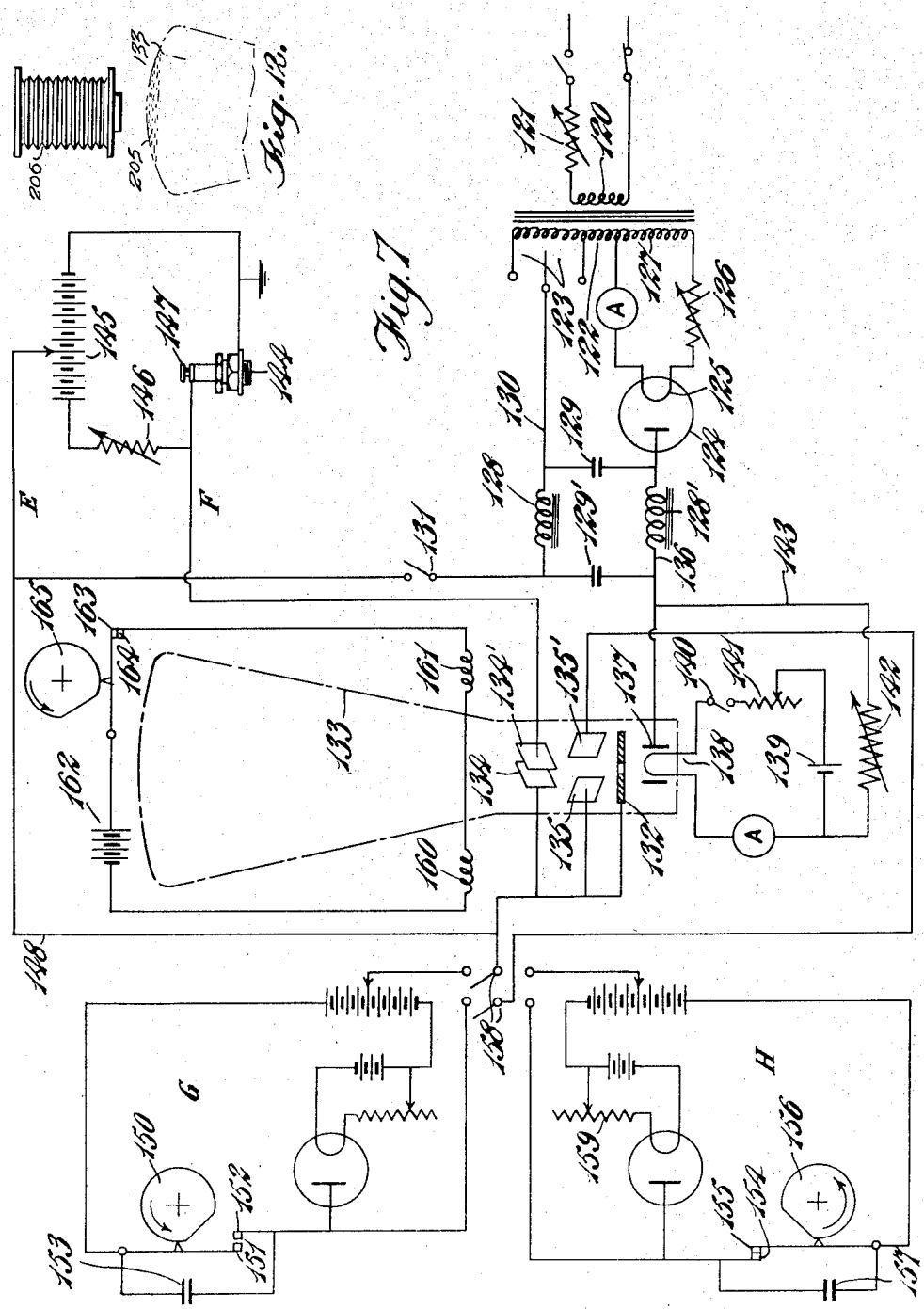

Patented Oct. 18, 1938

2,133,437

UNITED STATES PATENT OFFICE

2,133,437

APPARATUS FOR INDICATING THE VARIATION OF ONE QUANTITY RELATIVELY TO ANOTHER QUANTITY

Edwin Mathieson Dodds, Watford, England

Application March 30, 1933, Serial No. 663,499

4 Claims. (Cl. 73—185)

This invention relates to apparatus for indicating the variation of one quantity relatively to that of another and more especially for permitting the observation and/or recording with the aid of a cathode ray oscillograph of fluctuating fluid pressures, such as occur in the cylinders of internal combustion, steam, hydraulic and other engines or motors, such pressures being recorded with respect to time, crank angle or piston position. The invention, moreover, comprises apparatus for recording the pressure at which fuel is injected into the cylinder of an injection engine and for enabling such record to be identified with the record of the explosion pressures, and furthermore, apparatus for observing the relationship between pressure and time during the explosion of the charge in a firearm and in like phenomena.

One of the objects of my invention is the provision of an apparatus which enables a record of rapidly varying fluid pressures to be obtained with accuracy and ease, and which is substantially free from both mechanical and electrical inertia.

Another object of my invention is the provision of apparatus which will enable phenomena associated with or dependent upon rapidly varying fluid pressures to be recorded and compared with the pressure record.

A further object of my invention is the provision of apparatus which will enable the pressure, in the case where the phenomena under investigation are cyclic, to be recorded for any one cycle or as an average of a plurality of cycles.

A still further object of my invention is the provision of an apparatus which will enable a record to be taken which is magnified, e. g., with respect to time, so that, for example, the rate of pressure-rise during detonation in the cylinders of internal combustion engines can be measured exactly, and a record of other phenomena which are completed during a small rotation of the crank shaft of an engine can be obtained.

Other objects and advantages of my invention will be apparent from the following description read in conjunction with the annexed drawings, in which Figure 1 illustrates diagrammatically one form of apparatus in accordance with the invention together with the electrical circuits thereof.

Figure 2 shows in elevation to an enlarged scale, one form of resistance element.

Figure 2a is a section taken on the line 2—2, Figure 2.

Figure 3 illustrates diagrammatically one form of contact breaker mechanism for use with the timing device shown in Figure 1.

Figure 4 illustrates diagrammatically a modification of the contact breaker mechanism shown in Figure 3.

Figure 5 shows in elevation to an enlarged scale, a modified form of resistance element, and a circuit employed therewith.

Figure 6 is a section taken on the line VI—VI, Figure 5.

Figure 7 illustrates diagrammatically another form of apparatus in accordance with the invention, and its electrical circuits.

Fig. 10 is a longitudinal sectional view of a camera without a shutter used to photograph the diagram on the screen.

Fig. 11 is a side elevational view showing a camera in operative position to photograph the diagram on the screen of cathode ray tube 9 of Fig. 1; and Fig. 12 is a side elevational view showing a camera in operative position to photograph the diagram on the screen of cathode ray tube 133 as used in Fig. 7.

Figure 9:
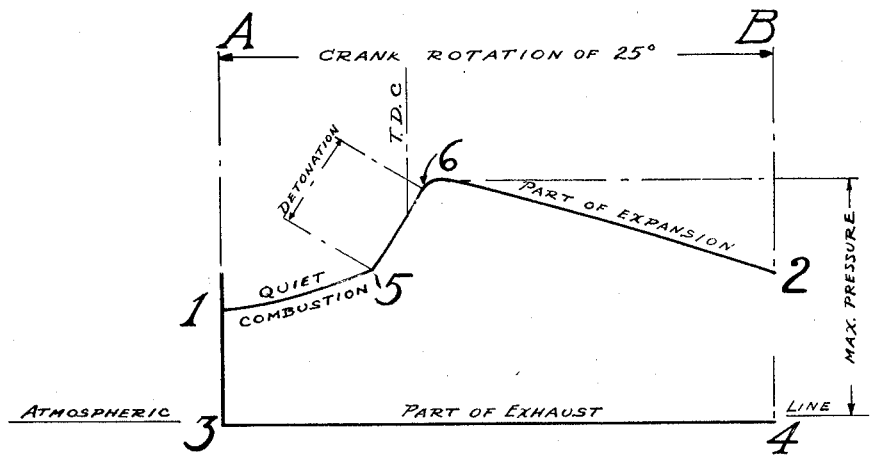
Fig. 9 is a diagrammatic view of the magnified diagram obtained of the part A—B of the full cycle.

In Figure 1 of the drawings there is shown diagrammatically one form of apparatus suitable for obtaining diagrams showing the change of pressure of a fluid with respect to time. The apparatus comprises a power unit, a timing device, a resistance element and a cathode ray oscillograph of the Western Electric Co.'s type employing a photographic screen.

The power unit comprises a transformer of which the primary winding 1 is connected by leads 2, 3 to a source of alternating current at, say, 220 volts. The primary winding 1 is provided with one or more tappings 4 so that the transformer can be used with alternating currents of lower voltage, say, 100 volts. Current from the low tension secondary winding 5 of the transformer is rectified by means of a metal rectifier 6, and the rectified current passes to the filament 7 of the tube 9 of the cathode ray oscillograph through leads 10 and 11, a smoothing condenser 12' of, say, 2000 microfarads capacity, being placed across the leads 10, 11. Regulation of the amount of current passing to the filament 7 is effected by means of a rheostat 12 provided with a coarse adjustment, and a rheostat 13 provided with a fine adjustment, which are included in lead 10, which also includes an ammeter. The high tension secondary winding 14 of the transformer is provided with tappings 15 so that a current with a voltage ranging between, say, 400 and 1000 may be obtained as desired. The high tension current is rectified by means of the high tension rectifying valve 16, the filament of which is fed from the low tension secondary winding 17 of the transformer, and the rectified current is smoothed by means of condensers 18, 18', and chokes 19, 19', said chokes being inserted in the positive lead 20 and the negative lead 21 respectively. The positive lead 20 is connected through switch 22 and resistance 23 to the perforated anode 24 of the cathode ray tube 9, whilst the negative lead 21 is connected to the centre tapping of a potentiometer 25 which is shunted across the filament 7 of the cathode ray tube. The grid 26 of the cathode ray tube is given a suitable positive potential relatively to the filament 7 by connection by a lead 29 with the tapping of a potentiometer 27 which is coupled in series with a resistance 28 across the high tension leads 20, 21. A smoothing condenser 30 is connected across the leads 21, 29, whilst both the core 31 of the transformer and the positive lead 20 are earthed through line 32. The cathode rays emitted by the filament 7 are sharply focussed on the screen 205 by suitable adjustment of the rheostats 12, 13, and the potential of the grid 26. The screen 205 may be formed by chemically treating the glass at the end of the tube 9. The screen is on the inner side of the glass wall at the top of the cathode ray tube.

The resistance element, which is indicated in Figure 1 by reference numeral 33, comprises a low resistance, the value of which is adapted to be changed in accordance with the change in pressure of the fluid of which it is desired to obtain a pressure-time diagram.

The low resistance element which I prefer to use is shown in Figures 2 and 2a. Referring to these figures the resistance element comprises an outer metal shell 60 which is closed at one end thereof by a metal diaphragm 61 which is preferably integral with the outer shell 60, so that leakage of the working fluid past the diaphragm into the interior of the resistance element is prevented. The outer shell 60 and the diaphragm 61 are advantageously made of stainless steel or like non-corrodible metal, and the lower part of the outer surface of the resistance element is screw-threaded so that it may be screwed into a cylinder of an internal combustion engine. Located within the outer shell 60 and spaced apart therefrom is a cup-shaped member 62, preferably also of stainless steel or like non-corrodible metal, and fitted within the cylindrically shaped recess of the member 62 is a plurality of circular carbon discs 63, the edges of which are prevented from contacting with the side walls of the cylindrically shaped recess by means of a layer 64 of paper, mica or like insulating material. The number of the carbon discs contained in the recess of the cup-shaped member 62 is such that when they are pressed into contact with one another and with the polished inner face of the diaphragm 61 and the polished end surface of the recess of the cup-shaped member 62, the end surfaces of the cup-shaped member 62 are not brought into contact with the diaphragm 61. The cup-shaped member 62 is held in position by a centrally disposed member 65, which is screwed into the cup-shaped member 62, and a screwed bush 66 which is provided at its ends with recesses which are adapted to receive washers 67 of mica or like insulating material, so that the whole central assembly comprising the cup-shaped member 62 and the member 65 is insulated from the outer shell 60 and the current will flow through the carbon discs 63 when an E. M. F. is applied across the terminal 69 on the outer shell 60 and the terminal 68 on the member 65. The desired initial pressure on the carbon discs 63 is attained by adjustment of the screwed bush 66 which is locked in position by locking ring 71. It follows that any change of pressure on the underside of the diaphragm 61 alters the compression-pressure between the carbon discs 63, thus changing the electrical resistance between terminals 68 and 69. The diaphragm 61 is light in weight and moves through only a minute fraction of an inch under the applied pressures, and the mechanical inertia of the device is extremely small. In addition, the natural frequency of the device is very high since a plain diaphragm without any connecting bars or links is employed. Even this high natural frequency is difficult to detect because of the excellent damping effect of the carbon discs.

If desired, inlet and outlet passages can be drilled through the bush 66, for example, so that distilled water at a constant temperature can be circulated through the annular space between the cup-shaped member 62 and the outer shell 60. In this manner the whole device may be kept cool and the electrical temperature co-efficient of the carbon eliminated.

Since the resistance is operated on directly by the diaphragm 61 without the interposition of rods, levers or the like, no spurious vibrations, due to these, can be introduced into the pressure records. The resistance element shown in Figures 2 and 2a, which is of the low resistance type, gives a variation of current with pressure and is connected as shown in Figure 1, viz.

The low resistance element 33 is connected in series with an accumulator or the like 37, of say, 2 volts, and a pair of deflecting coils 34, 34' which are arranged outside the neck of the tube 9 opposite one another with their axes substantially in alignment. Although the axes of the coils 34, 34' are shown for the sake of clearness as lying between the plates 35, 35' and the screen 205, in practice the axes of such coils lie between the plates 35, 35' and the plates 36, 36', as shown by the dotted line X—Y. In Fig. 1, plates 35 and 35' are grounded since the coils 34 and 34' are used to apply the current fluctuations from the resistance element 33.

From the above description it will be seen that any change in the pressure of the fluid in contact with the diaphragm of the resistance element 33 will cause a corresponding change in the resistance of such element and thus a corresponding change in the electromagnetic field due to the coils 34, 34'. The cathode spot on the screen 205 is thus given a deflection which is proportional to the change in the pressure applied to the resistance element. By suitable initial adjustment of the resistance element 33 the movement of the cathode spot on the screen can be made linear with the pressure applied to the resistance element. Coils 38, 38' are connected in parallel with coils 34, 34' and are so arranged that their axes are in alignment with the axes of coils 34, 34' and that the electromagnetic flux due to such coils opposes that of coils 34, 34'. By varying the electromagnetic flux due to the coils 38, 38' by means of the variable resistance 39, the deflections of the cathode ray may be posititoned on the screen 205 of the cathode ray tube to best advantage. By keeping the deflecting coils 34, 34', 38, 38' reasonably small and with as few turns as possible, the electrical lag due to self-induction is substantially negligible.

Simultaneously with the deflection given to the cathode ray which is proportional to the pressure applied to the resistance element, the cathode ray by means of a timing device is given a deflection, which is proportional to time and which is at right angles to the deflection proportional to pressure. The combination of these two movements of the cathode ray results in a well-defined pressure-time diagram due to persistence of vision. Such pressure-time diagrams may be photographed in a camera 206 as explained more fully hereinafter.

The timing device shown diagrammatically in Figure 1 consists of a voltage-saturated diode tube 40 which charges a condenser 41 at a constant rate controlled by a variable resistance 42 which is in series with a low tension accumulator or the like 43 feeding the filament of the diode 40. As shown in Figure 1, the plate of the diode 40 is connected to one plate of the condenser 41 by lead 50, and to deflecting plate 36 of the cathode ray tube by lead 51. The positive lead from a high tension battery or the like 52 is connected to the other plate of the condenser 41 through lead 53, whilst the negative lead from the high tension battery 52 is connected to the positive of the low tension battery 43 through lead 54. The anode 24 of the cathode ray tube 9 is connected to plate 36' in such tube and to the tapping 55 of the high tension battery 52. In accordance with my invention the charging of the condenser 41 is synchronized with the speed of the engine by means of a contact breaker 44, which is shunted across the condenser 41. The contact breaker 44 consists of a cam 45 connected to the engine crankshaft, and an arm 47 having a projection 74 thereon which is suitably held in engagement with the cam 45. The arm 47 carries contacts 46, 46' at one end thereof, whilst contacts 48, 49 are suitably positioned near the contacts 46, 46', so that the cam, during the greater part of one complete revolution, holds the contact 46 in engagement with contact 48 and out of engagement with contact 49, whilst when the projection 74 engages the flattened portion of the cam the contact 46' engages with contact 49 and the contact 46 is brought clear of the contact 48. It will be observed that when the change-over switch 56 is in the position shown, the condenser 41 is short circuited during a small fraction of the 360° rotation of the cam 45 connected to the engine crankshaft. Thus, the potential difference between the plates of the condenser 41 is zero at the moment when the contact breaker 44 opens. From this instant onwards the condenser 41 is charged at a rate proportional to time, that is, to crank-angle if the engine is running at a steady speed, until the cam 45 again closes the contacts 46', 49. This instantly discharges the condenser 41 and the cycle repeats itself once every revolution of the engine. As shown in Figure 1, one plate of the condenser 41 is coupled to deflecting plate 36 in the cathode ray tube through leads 50, 51, and the other plate of the condenser is coupled to deflecting plate 36' through lead 53, the high tension battery 52 and the anode 24 of the cathode ray tube, with the result that the cathode spot moves steadily across the cathode screen during the greater part of a complete rotation of the cam 45 due to the change in the electrostatic field set up by the plates 36, 36' and then flies back instantly to its initial position when the condenser 41 is short circuited. The distance through which the cathode spot moves, (that is, the width of the complete picture) is controlled by the setting of the resistance 42. The position of the cathode spot on the screen can be controlled by varying the position of the tapping 55 of the high tension supply to the diode 40. The plates 36, 36' are positioned relatively to coils 34, 34', so that the deflections of the cathode spot which are proportional to pressure are at right angles to the deflections which are proportional to time. The combination of the two effects gives a diagram of the conventional pressure-time type owing to the persistence of vision. The picture, if cyclic, can be traced, or photographed as described hereinafter. Furthermore, single cycles or a part of a cycle may be photographed. The deflecting plates 35, 35' are provided in the cathode ray tube for a purpose which will be described hereinafter. The deflecting plates in the cathode tube which are not in use are earthed, otherwise they acquire a charge and deflect the cathode spot. Both the power unit and the timing device are preferably housed in earthed metal containers.

When it is desired to examine any small part of a cycle, the two-way switch 56 is thrown over to the alternative position. In this position the condenser 41 is short-circuited over the greater part of a revolution of the engine crankshaft and remains open only over a small angle, for example 20°. The cathode spot therefore remains stationary for 340° and then sweeps across the screen during the following 20° at a constant rate. This rate, however, is arranged to be many times greater than for the conventional pressure-time diagram by a suitable decrease in the resistance 42. The arm 47 and the contacts 48, 49 are adapted to be adjusted by turning the casing or frame in which they are mounted relatively to the crankshaft cam 45. In this manner any 20° interval of a revolution can be selected and magnified with respect to time many times as compared with the same interval on a conventional pressure-time diagram.

One form of the contact breaker mechanism is shown diagrammatically in Figure 3, wherein parts corresponding to those indicated in Figure 1 are designated by the same reference numerals. A disc 72 of suitable insulating material is provided with a centrally-disposed aperture 73 through which extends the cam 45 mounted on the engine crankshaft. An arm 47 having contacts 46, 46' on either side and at one end thereof is pivotally mounted on the disc 72 and the projection 74 thereon is maintained in contact with the cam 45 by the action of a spring 75. The alternative contacts 48, 49, which are provided at the ends of flexible metal strips 76, 77 that are secured to the terminal blocks 78, 79 respectively, are provided with adjustable stops 80, 81. These adjustable stops allow the angle during which either contact, 48 or 49, remains open to be varied as desired, and, in addition, provide a quick break action. The contacts are of the rubbing type due to the different radii of their supporting arms and they therefore remain clean for long periods without attention. The disc 72 is adjustably mounted so that the contact breaker mechanism can be rotated relatively to the cam 45 and the contacts opened and closed when the crankshaft is in the desired position.

It is advisable when using the contacts 48, 46 to pull the contact 49 quite clear of the arm 47 by means of the adjustable stop 81, and vice versa. This is advantageously effected automatically by employing a switch 56 (Figure 1) which is of the rotary type, and incorporating it in the contact breaker mechanism, an insulated cam being provided on the switch spindle, so that movement of the switch throws either the contact 48 or the contact 49 as the case may be, out of the way of the arm 47. Such an arrangement is shown diagrammatically in Figure 4, wherein parts corresponding to those in Figure 3 are designated by like reference numerals.

From Figure 4 it is seen that the cam 82 secured on the spindle 83 of the rotary switch (not shown), in the position shown holds contact 48 clear of the arm 47, and that on movement of the switch through an angle of 180°, the contact 49 is automatically thrown clear of the arm 47 whilst the contact 48 is brought into operation.

The advantages of the apparatus described above will be readily apparent. The timing device enables a cathode ray oscillograph to be employed for the obtaining of pressure-time diagrams and thus errors due to the use of a recorder possessing inertia and a natural period of vibration are obviated. Moreover, the timing device enables the deflection of the cathode spot which is proportional to time to be synchronized with the engine, and, furthermore, enables any desired small fraction of a crankshaft revolution to be magnified with respect to time, so that, for example, the rate of pressure rise during detonation can be measured exactly. The apparatus proper does not require valve or transformer amplification and thus the distortion and uncertainty attendant on the use of such apparatus are obviated. The diagrams obtained can be calibrated against pressure either statically, or dynamically on the engine against a peak compression gauge and a peak quiet combustion gauge.

Figure 8:
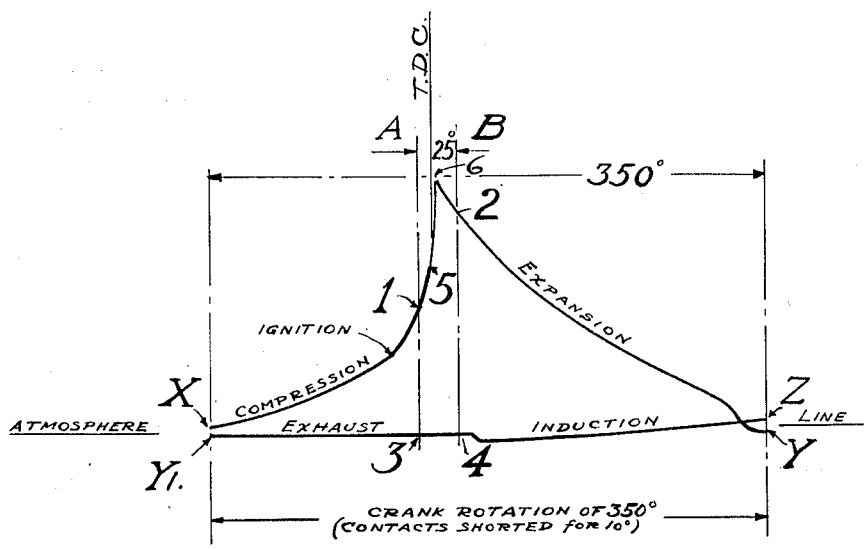
Fig. 8 is a diagrammatic view showing the type of diagram obtained for a full cycle.

Referring to Figure 8, a diagram is shown which is referred to a 4-stroke gasoline engine cycle with the cam of the breaker mechanism running at crankshaft speed. In this diagram the path of the spot is from X to Y, from Y to Y' (instantaneous), from Y' to Z, and from Z to X (instantaneous). The spot then travels back from X to Y, etc. In the diagram of Figure 9, a magnified showing is made of the part A—B of the full cycle of Figure 8.

Although my apparatus has been described with reference to the observation and recording of the relation between time and pressure in the cylinders of internal combustion and like engines, it will be clearly understood that the apparatus is not limited to this application. For example, the apparatus may be employed to obtain a conventional pressure-volume diagram, and for the purpose of obtaining a deflection of the cathode spot which is proportional to volume, a two-pole A. C. generator without commutator is used, and the output voltage is reduced to a satisfactory value by means of a potentiometer shunted across the leads. This potentiometer should possess a minimum of inductance and capacity. The said poles are preferably made so that their centre lines are substantially radial with respect to the axis of the armature shaft. The apparatus may also be employed for determining the pressure-time relationship during the explosion of the charge in a fire-arm or the like. In the case of a rifle, the low resistance element is screwed into the barrel in a convenient position and the timing device is employed with a high writing speed. The contact breaker 44, which short-circuits the condenser 41 (Figure 1) is arranged to be opened by the trigger mechanism, which also closes the switch 22 an instant before firing occurs. A single sweep of the cathode spot across the screen proportional to time is thus effected when the rifle is fired and since the cathode spot is also given a deflection proportional to pressure, which is at right angles to the deflection proportional to time, there results a diagram representing pressure against time which may be photographed. The diagram can be calibrated against time from the known capacity of the condenser 41 and the emission of the diode 40.

In the apparatus shown in Figure 1, the displacement of the cathode ray which is proportional to pressure is effected electromagnetically whilst the displacement of the cathode ray proportional to time is effected electrostatically.

By substituting for the carbon discs 63 (Figure 2a) others made from compositions similar to those employed for the ordinary radio resistances, the resistance element can be converted into one of the high resistance type. If such a resistance element is then coupled to the deflecting plates 35, 35' (Figure 1) of the cathode ray tube by a circuit, as shown in Figure 5, a potential difference is set up between such plates varying with the pressure applied to the resistance element, and the deflection of the cathode spot proportional to pressure is effected electrostatically.

One form of high resistance element is shown in Figures 5 and 6. As shown in these figures the resistance element comprises an outer metal shell 105 closed at one end by a metal diaphragm 106. The diaphragm 106 is preferably integral with the outer shell 105 and both the outer shell and the diaphragm are preferably constructed of non-corrodible metal such as a stainless steel. Securely clamped within the outer shell 105 by means of the locking ring 107 are a plurality of washers 108 of insulating material, such as ruby mica, forming an insulating sleeve. A quantity of a resistance powder 109 of suitable conductivity containing a small percentage of mica or the like to prevent "packing" is placed upon the diaphragm 106 in the insulating chamber formed by the washers 108, and this resistance powder 109 is suitably compressed by means of a plunger 110, which is adapted to slide in the cylindrical chamber formed by the washers 108. The upper part or stem 111 of the plunger 110 is arranged within a member 112 of insulating material such as a series of mica washers as shown. The adjustment of the plunger 110 is effected by the rotation of the screwed metal sleeve 113 carrying the insulating member 112, the metal sleeve 113 being secured in the desired position by means of the screwed bush 114. As shown in Figure 6, the stem 111 of the plunger 110 may be separate from the body part thereof and be secured thereto in any suitable manner, for example, by means of a pin 115. A terminal 116 is provided on the upper part of the stem 111 and a terminal 117 is provided on the outer shell 105. This type of resistance element is connected to deflecting plates of the cathode ray tube by a circuit as shown in Figure 5 wherein the resistance element is placed in series with a high tension battery or the like 118 of, say, 240 volts, and an adjustable resistance 119. It will be seen that pressure changes on the diaphragm 106 cause a corresponding change in the conductivity of the resistance powder 109 and thus a corresponding voltage change between points C and D which are placed in electrical communication with the deflecting plates 35, 35' (Figure 1) respectively. By suitable choice of the circuit constants and a suitable initial adjustment of the resistance element, it is possible to obtain a deflection of the cathode spot proportional to the pressure applied to the diaphragm 106. With such a resistance element the metal parts are designed so that the capacity is kept low, in order to minimize attenuation at high frequencies, and incidental capacities in the circuit must be kept as small as possible. When this high resistance element is used with the apparatus shown in Figure 1, the power unit must be disconnected from earth.

The complete electrical circuit of a modified form of apparatus comprising a high resistance element, a power unit arranged in conjunction with a Von-Ardenne cathode ray tube and duplicate timing devices, is shown diagrammatically in Figure 7. Referring to Figure 7 the power unit comprises a transformer of which the primary winding 120 is connected through a rheostat 121 to a suitable source of alternating current at, say, 220 volts. The high tension secondary winding 122 is provided with tappings 123 so that a current having a voltage ranging from 1800 R. M. S. to 700 R. M. S. may be obtained as desired. The high tension current from the secondary winding 122 is rectified by means of a rectifying valve 124, the filament 125 of which is connected through a rheostat 126 to the low tension secondary winding 127. The rectified high tension current is smoothed by means of the chokes 128, 128' having an inductance of, say 3000 henries, and the condensers 129, 129' of, say 2 microfarads capacity. The positive lead 130 is connected through switch 131 to the perforated anode 132 of the cathode ray tube 133 and also to deflecting plates 134, 135. The negative lead 136 is connected to the grid 137 of the cathode ray tube, the grid being thereby given a negative potential as is necessary with a Von-Ardenne tube. The filament 138 of the tube 133 is supplied with current from a low tension battery or the like 139 through a potentiometer 141 and switch 140, the negative lead 136 of the high tension supply being connected by lead 143 to the negative of the battery 139 through a rheostat 142. The resistance element 144, which is of the high resistance type, is arranged in series with a high tension battery or the like 145, of say, 240 volts, and a rheostat 146, one terminal 147 of the resistance element being connected to the deflecting plate 134' in the tube 133, the other terminal being connected to earth as shown. The plate 134 in the tube 133 is connected through lead 148 to a tapping on the high tension battery 145. It will be apparent that variation in the resistance of the resistance element 144 occasioned by variation in the pressure of the fluid acting thereon causes a voltage change between the points E and F and thus a corresponding deflection of the cathode spot occasioned by the change in the electrostatic field set up by the plates 134, 134' in tube 133.

In the timing device shown in Figure 1, a cam (45) was arranged in conjunction with two contacts (48, 49) and a switch (56) so that, according to the position of the switch a movement of the cathode spot proportional to time could be obtained during the greater part or during only a small fraction of a revolution of the cam. In the apparatus shown in Figure 7, one timing device is provided for obtaining a movement of the cathode spot during the greater part of a revolution of the cam, whilst a separate timing device is provided for obtaining a movement of the cathode spot during only a small fraction of a revolution of the cam. The timing devices, denoted generally by reference letters G and H, are, however, similar to that shown in Figure 1 and it will not be necessary to describe these in detail.

It will be seen that the cam 150 of the timing device G holds the contacts 121, 152 open during the greater part of one revolution of the cam and that the condenser 153 is short-circuit for only a small part of the revolution of the cam. The contacts 154, 155 of timing device H, on the other hand, are arranged so that they are closed during the greater part of a revolution of the cam 156 and thus the condenser 157 is only charged during a small part of a revolution of the cam 156. A two-pole switch 158 enables either condenser 153 or condenser 157 to be coupled to the deflecting plates 135, 135' so that, according to the position of the switch 158, a deflection of the cathode spot proportional to time may be obtained during the greater part of one complete revolution of the crank-shaft of the engine to which the cams 150, 156 are coupled, or during only a small fraction of one complete revolution. In the latter case, by suitably decreasing the value of the resistance 159 the deflection of the cathode spot may be magnified many times as compared with the deflection for a corresponding interval obtained in the case where the timing device G is employed. The power unit and the timing devices G, H are preferably housed in earthed metal containers.

Both in the case of the cathode ray tube 9, Figure 1, and in the case of the cathode ray tube 133, Figure 7, in order to obtain as large a picture as possible, it is advisable to construct the tube with a large screen arranged as far as possible from the deflecting plates or coils.

The switch (22 in Figure 1 and 131 in Figure 7) in the anode circuit of the cathode ray tube is preferably arranged in an accessible position with a pair of external terminals so as to enable it to be substituted by a cam-operated switch driven by the engine when it is desired to photograph the diagram on the screen using a camera without a shutter as illustrated in Fig. 10. The camera includes a dark box 207 mounted on a light-proof wall 208 surrounding the tube 9 in Fig. 1 or tube 133 in Fig. 7. A film 210 is suitably supported on rolls 211 in the box 207. This cam-operated switch is of the type which can be adjusted so that the cathode ray tube lights up for a number of engine cycles or for one only, and must be geared down from the engine to such an extent that sufficient time elapses before the switch again closes to enable the photographic plate which has been exposed to be removed. Whenever the apparatus is to be used for a considerable time it is advisable to leave the source of alternating current in circuit the whole time, and to close the anode circuit switch only when pictures are desired. Leaving the tube filament in circuit when the anode current is switched off has been found to improve the tube.

An alternative arrangement for obtaining photographs using a camera without a shutter is shown diagrammatically in Figure 7. As shown in this figure, deflecting coils 160, 161 arranged around the cathode ray tube 133 are connected in series with a low tension battery or the like 162, and contacts 163, 164 are arranged to be opened and closed by means of the cam 165 geared to the engine. The apparatus is so arranged that, when the contacts 163, 164 are closed the cathode spot is deflected clear of the tube screen, the cathode spot returning to the screen when the cam 165 separates the contacts 163, 164. The time of this separation can be set for one cycle or more as desired.

By using a high speed timing device wherein a portion of the cycle of operations is magnified or extended, for example as shown in Figures 1 and 7, it is possible to record isolated phenomena connected with the pressure changes shown by the resistance element. For example, by connecting a capacity potentiometer between the spark plug of a cylinder of an internal combustion engine and earth and joining the junction of the condensers to the appropriate deflecting plate in the tube, an oscillogram of the high-tension voltage across the plug is obtained, and the occurrence of the spark or sparks relative to the pressure-diagram is immediately obvious.

I claim:

1. Apparatus for indicating the relation between pressure and time in the cylinders of internal combustion and like engines, comprising a resistance element operatively associated with the cylinder, the resistance of which is adapted to vary in accordance with the pressure in the cylinder, a cathode ray oscillograph, means whereby alteration in the value of said resistance causes a corresponding electromagnetic displacement of the cathode ray, a condenser coupled to deflecting plates in the tube of the cathode ray oscillograph, a voltage-saturated diode tube charging the condenser at a constant rate, and a cam which is adapted to be rotated and to open and close periodically contacts which are included in a circuit shunted across the said condenser.

2. Apparatus for indicating the relation between pressure and time in the cylinders of internal combustion and like engines, comprising a resistance element operatively associated with the cylinder, the resistance of which is adapted to vary in accordance with the pressure in the cylinder, a cathode ray oscillograph, means whereby alteration in the value of said resistance causes a corresponding electromagnetic displacement of the cathode ray, a condenser coupled to deflecting plates in the tube of the cathode ray oscillograph, a voltage-saturated diode tube charging the condenser at a constant rate, a pivoted arm carrying a contact in electrical communication with one plate of the condenser, a contact in electrical communication with the other plate of the condenser, and a cam which is driven at crankshaft speed and which engages with said pivoted arm, whereby the said contacts are held closed during the greater part of one revolution and are held apart during the remaining part of the revolution.

3. Apparatus according to claim 2, in which the said contacts are mounted so that they can be rotated relatively to said cam.

4. In apparatus for indicating fluctuating fluid pressures with the aid of a cathode ray oscillograph, a timing device effecting an electrostatic displacement of the cathode ray proportional to time, said timing device comprising a condenser coupled to deflecting plates in the cathode ray tube, a voltage-saturated diode tube adapted to charge the condenser at a constant rate, and a cam-actuated contact breaker shunted across the condenser whereby the cathode ray during each revolution of the cam is uniformly deflected during part of a revolution of the cam and is returned to its initial position when the condenser is short-circuited.

EDWIN MATHIESON DODDS.